United States Patent Office 2,876,816
Patented Mar. 10, 1959

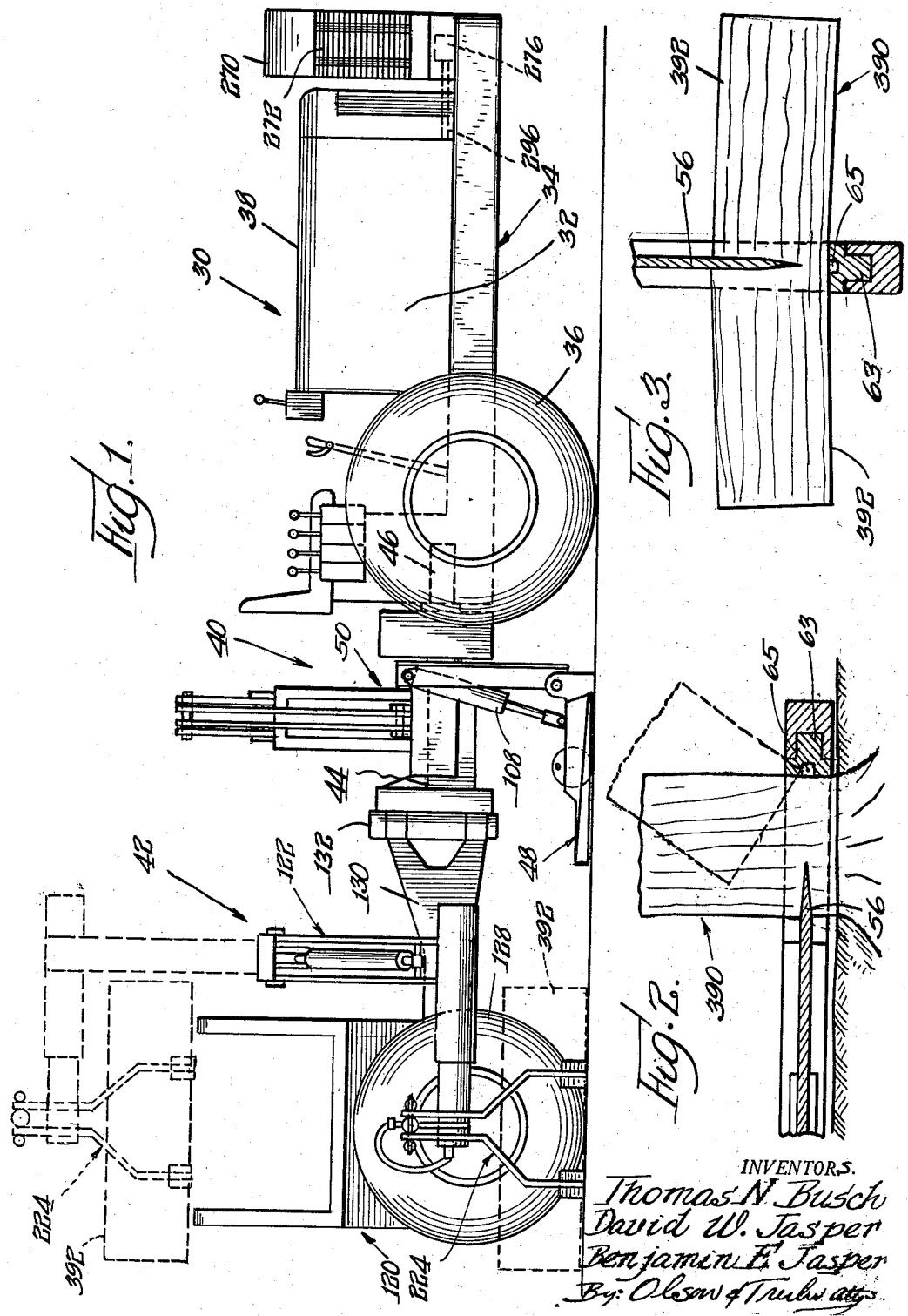

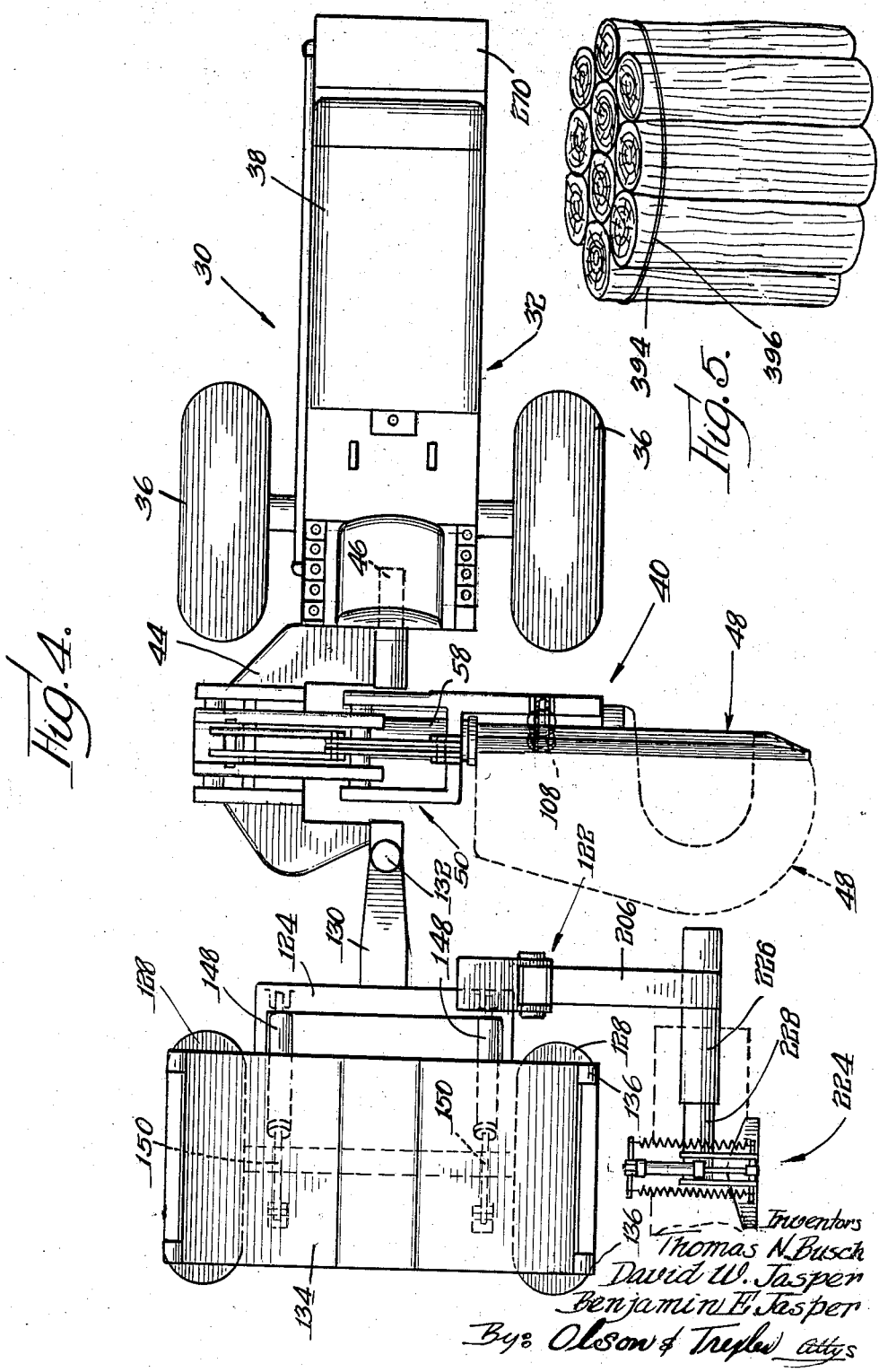

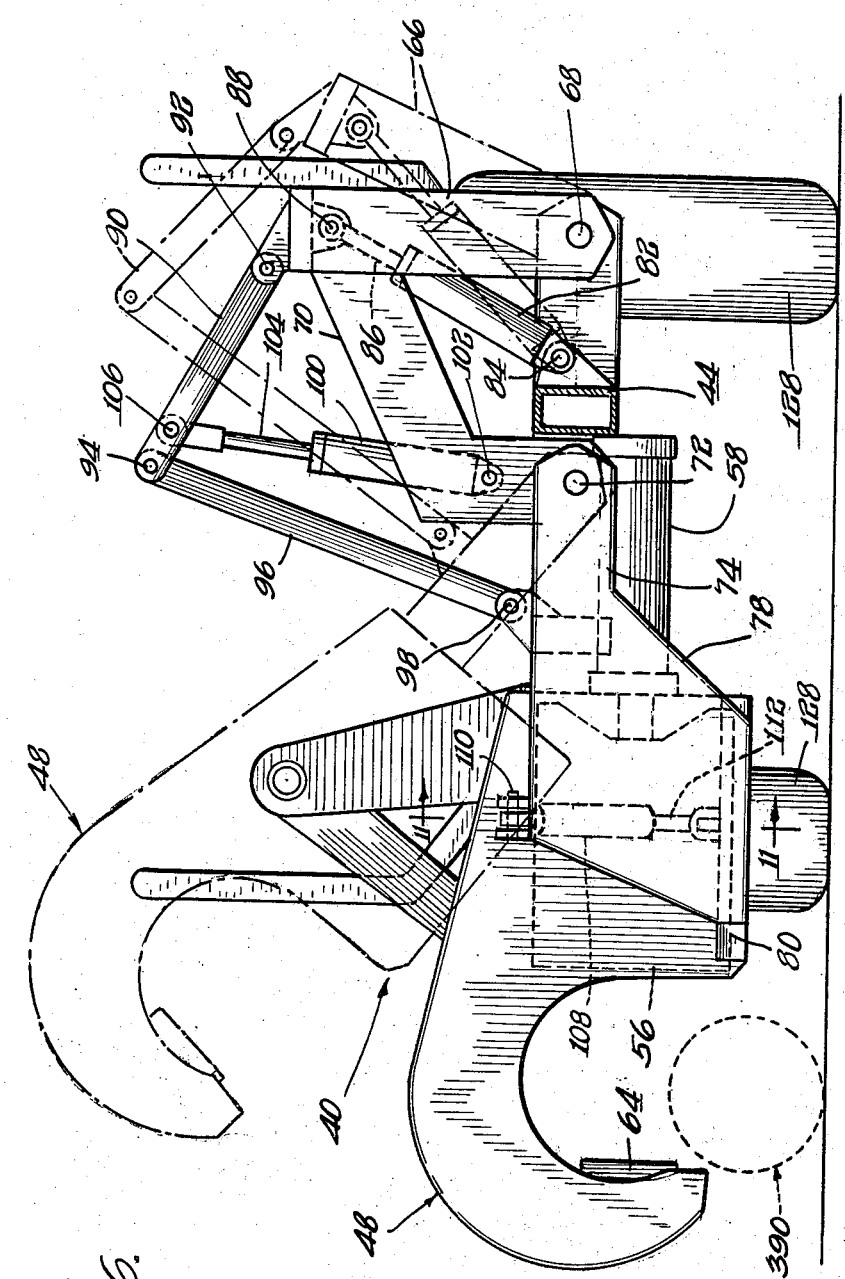

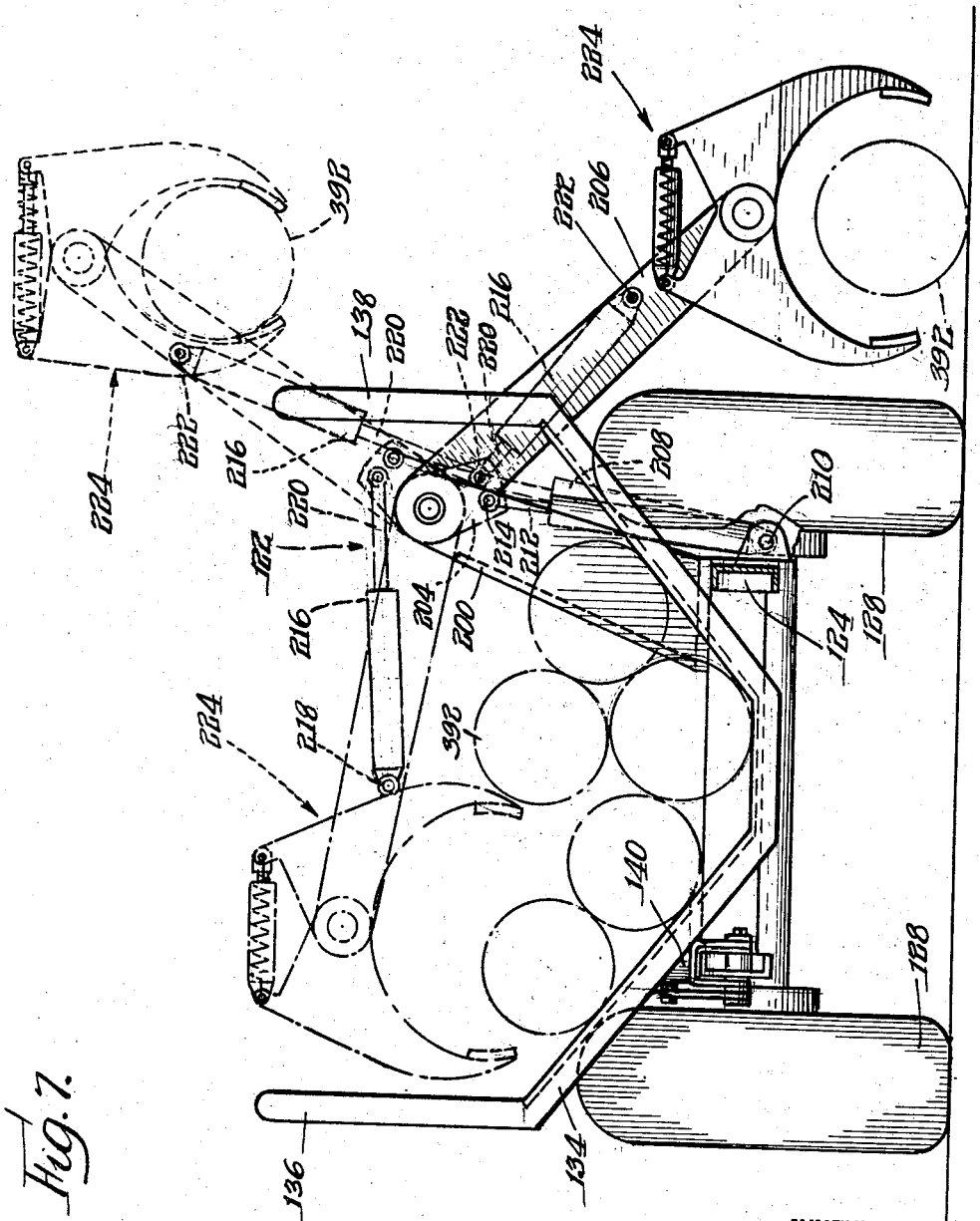

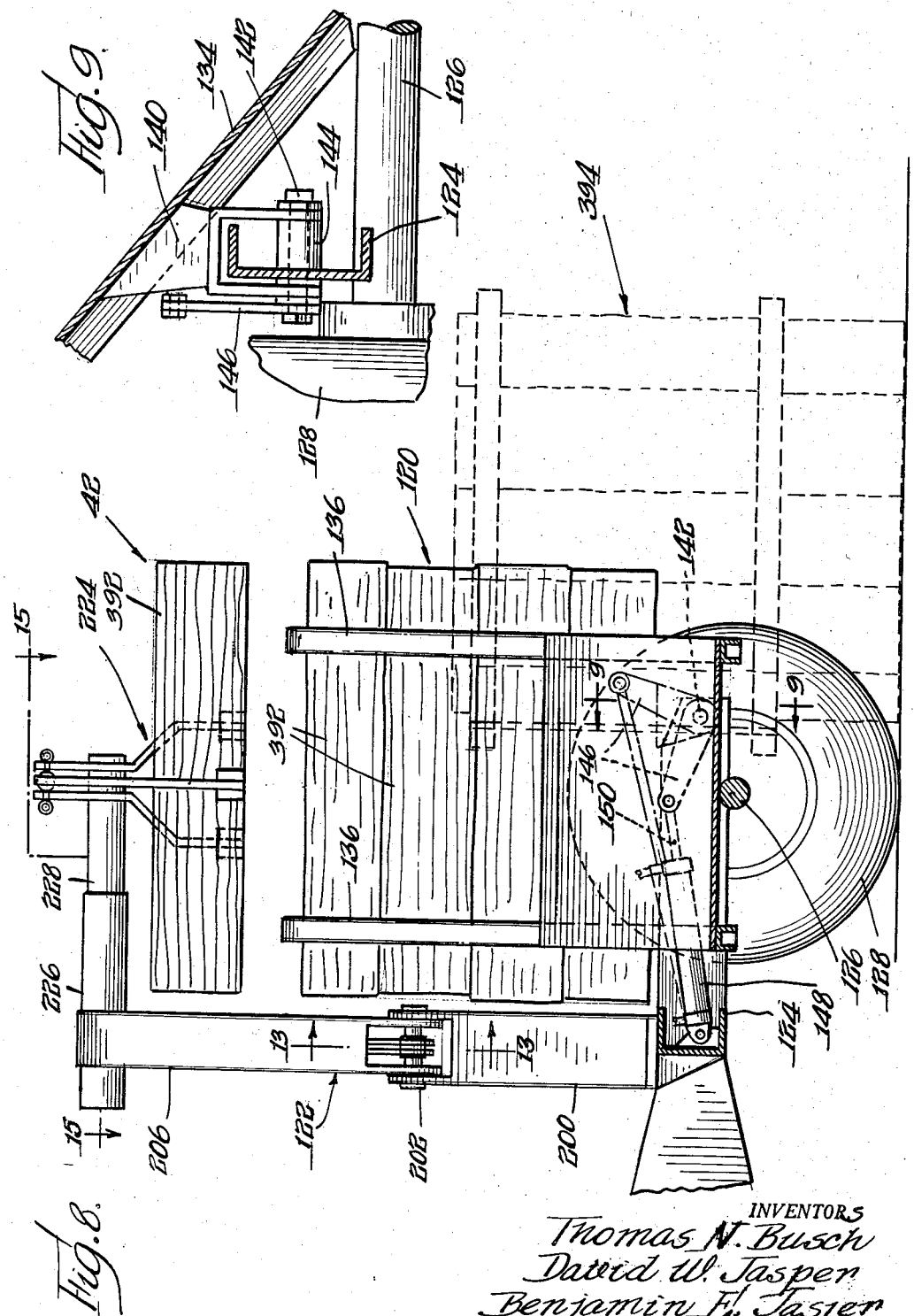

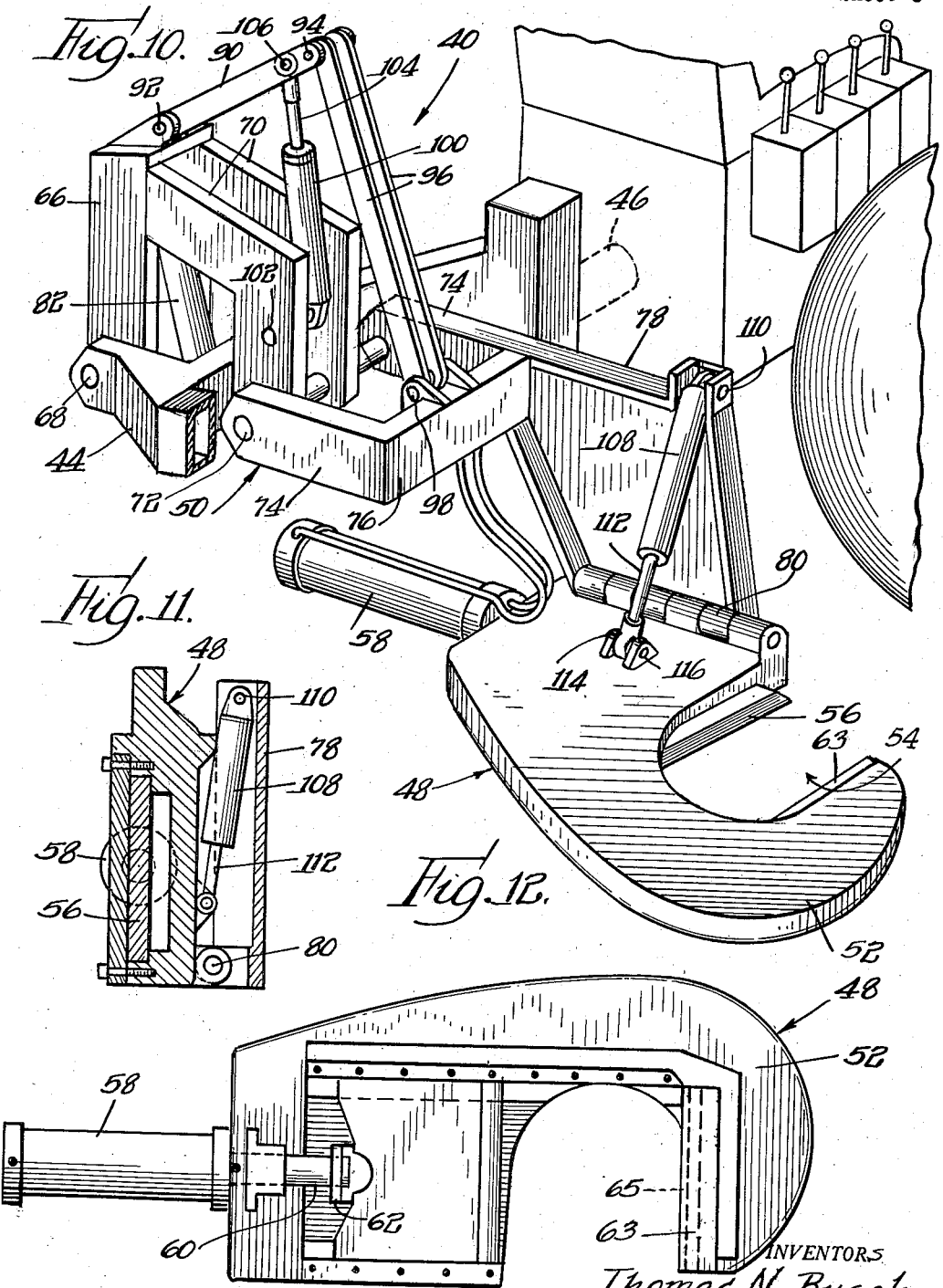

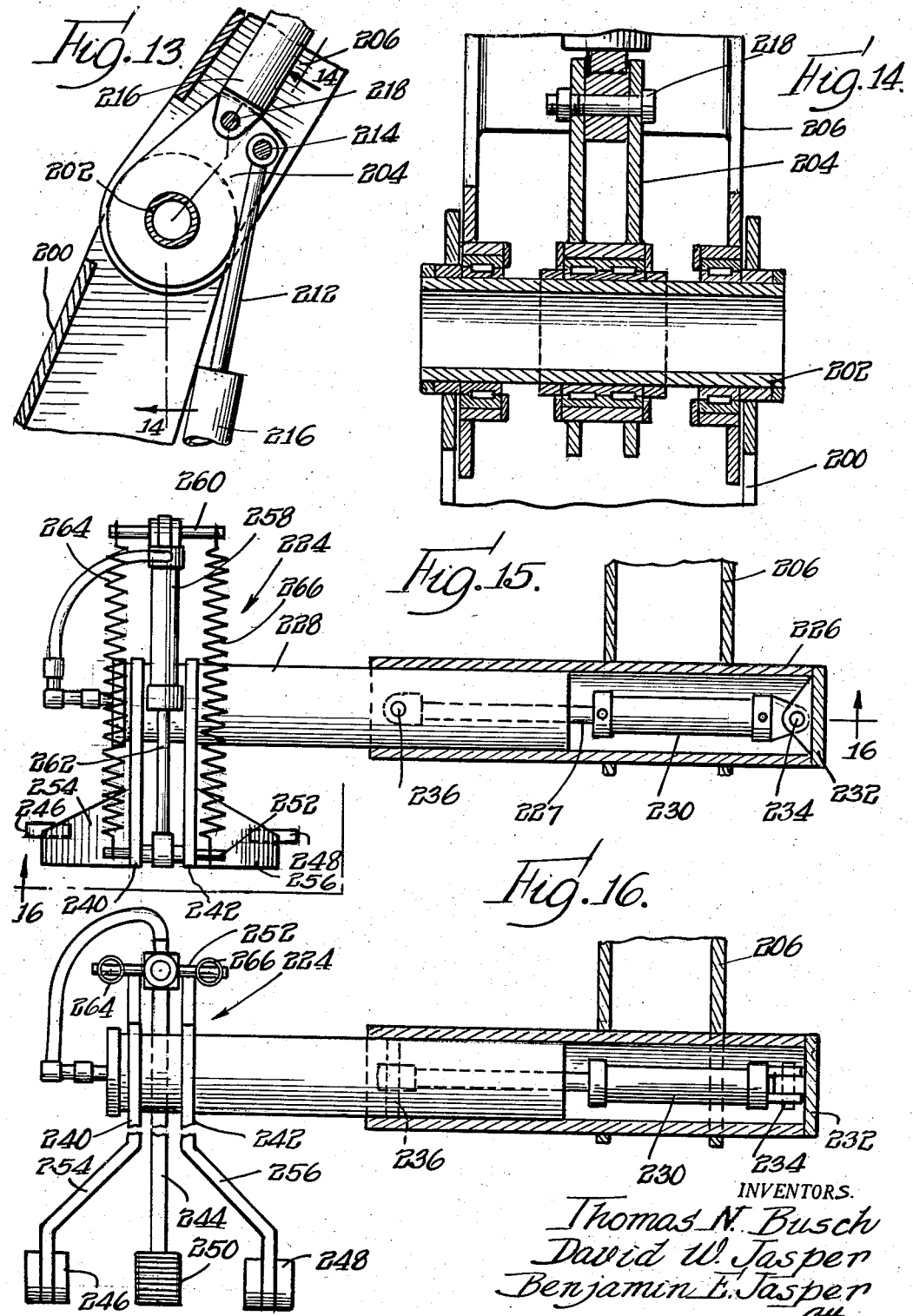

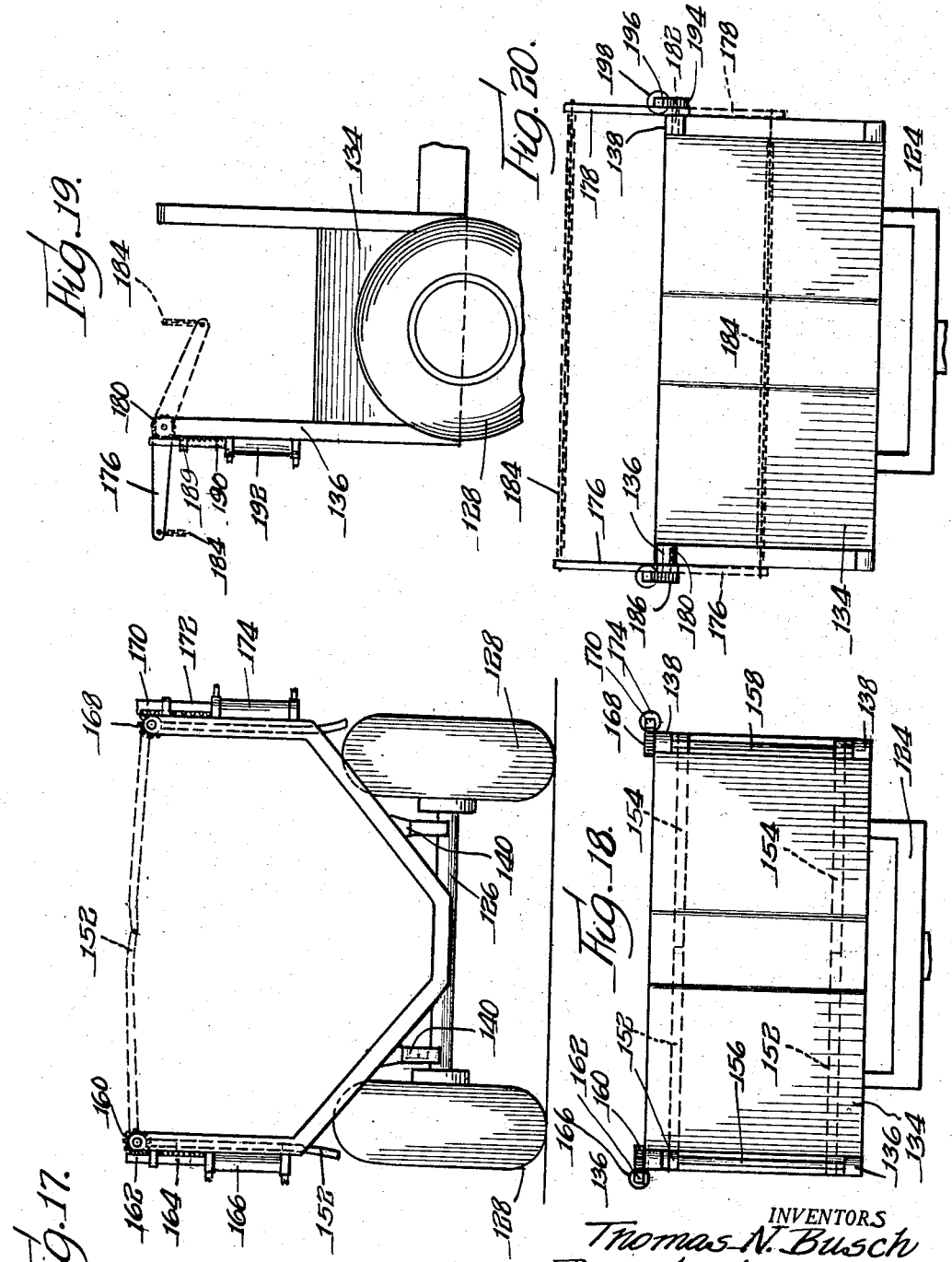

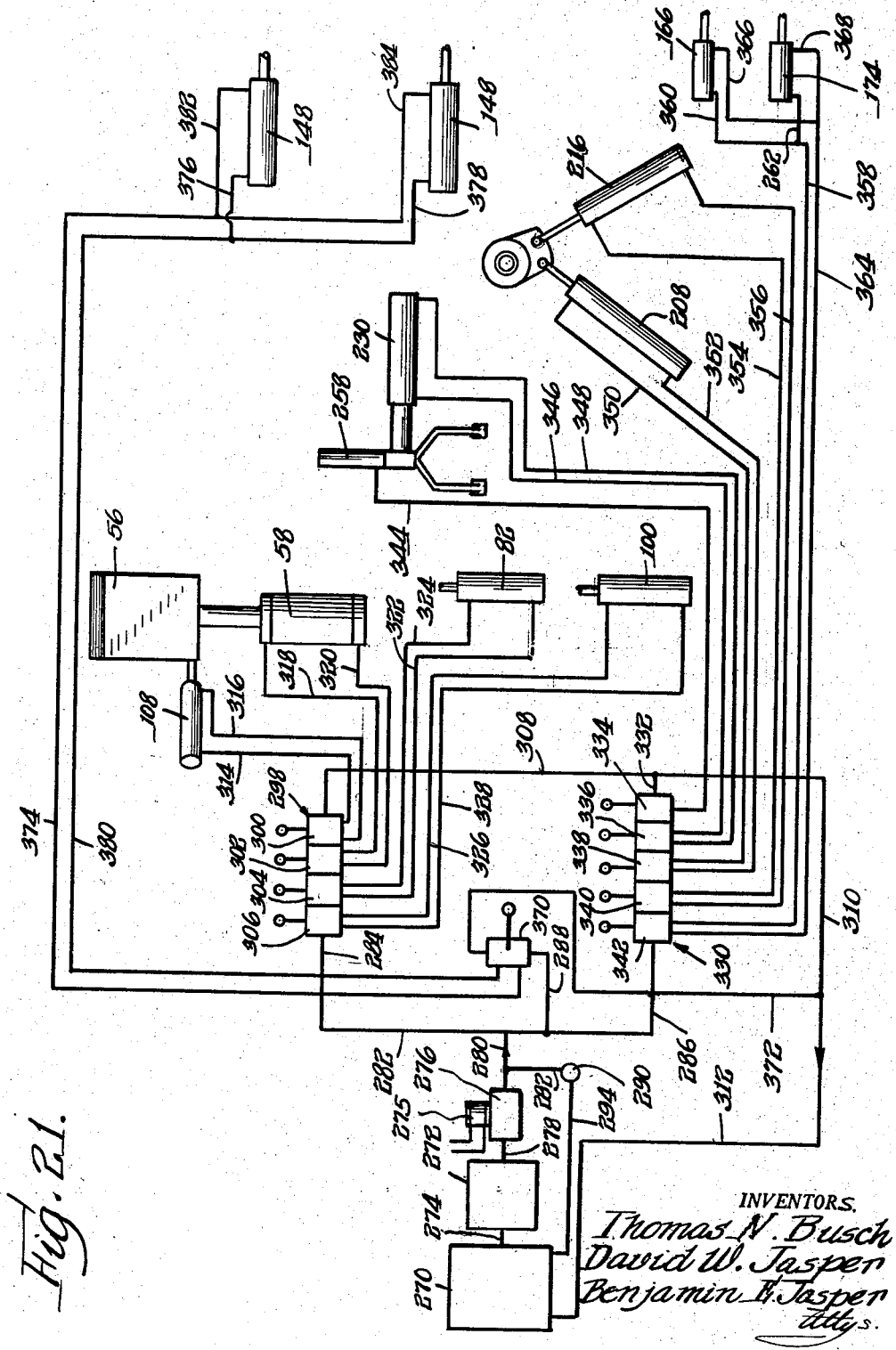

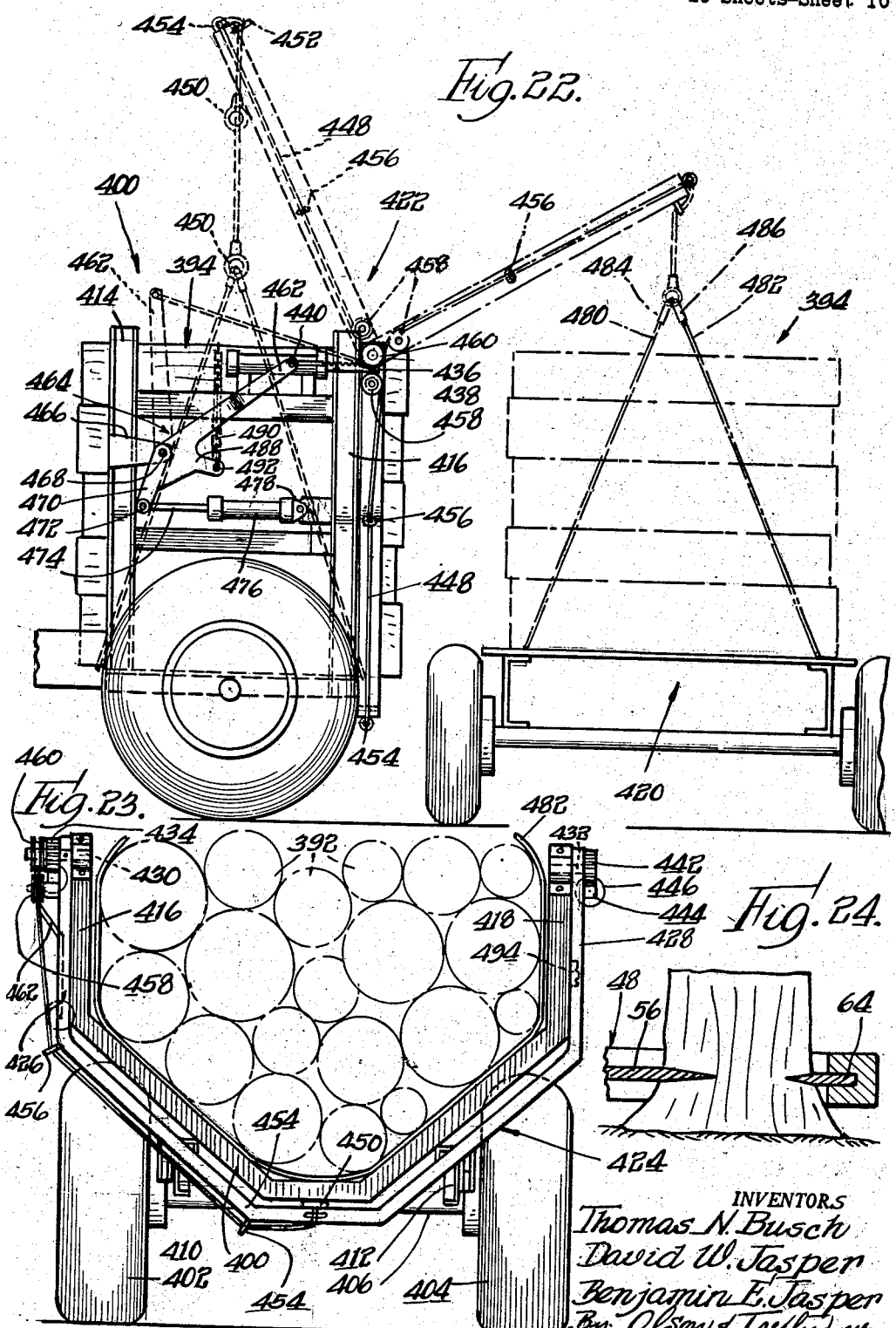

2,876,816

METHOD AND APPARATUS FOR HARVESTING TREES

Thomas N. Busch, Daphne, Ala., and David W. Jasper, Chicago, and Benjamin E. Jasper, Kankakee, Ill.

Application December 23, 1954, Serial No. 477,162

19 Claims. (Cl. 144—309)

The present invention relates to a novel method and apparatus for harvesting and processing trees.

In accordance with current practices, trees are harvested by methods requiring various sequences of operations and the use of a number of different tools, tractors, horses, saws, skidders, trucks, cranes, and the like. More specifically, the trees are felled by using handsaws, manually manipulated power saws, axes, wedges and sometimes guide ropes. This procedure obviously requires a considerable amount of manual labor. In order to reduce the amount of manual labor, various machines have heretofore been proposed for felling trees but such machines have not been found to be sufficiently practical for harvesting trees from a forest. After a tree has been felled, it is often cut into sections by using power or handsaws and these sections are then individually carried to and deposited on a stack to await further transportation. In accordance with the present practice, the logs or sections are stacked lengthwise on the ground. In order to retain the stacked sections in a convenient bundle for further transportation, it is necessary to wrap one or more heavy chains or cables around the stack. Such heavy chains or cables are relatively expensive and are difficult to manipulate. After the bundle has been formed in the manner just described, it is usually picked up by a crane and deposited on a truck or other means of transportation. When picking up the bundle by means of a crane or the like, it is necessary to pass a cable or chain sling around the bundle. With the log sections disposed horizontally, the sling must be passed beneath the bundle which is a relatively difficult and time consuming operation. In addition, as will be appreciated by those familiar with the art, snakes often gather beneath the bundles of logs and workmen passing the slings beneath the bundles are frequently bitten.

It has been found that when trees are felled and sectionalized with a saw, the ends of the severed wood fibers are torn and opened so as to permit entry therein of decay and other organisms. Thus, a considerable amount of the wood may be damaged if the log sections remain in stock piles for a substantial period of time. Another disadvantage of saws is that sawdust is created and the sawdust from a great number of trees amounts to a considerable loss of wood and creates a fire hazard. Also, it has been found that power saws cannot safely be operated substantially at ground level since there is danger of striking obstacles such as rocks and the like which damage the saw.

It is an important object of the present invention to provide a novel method and apparatus whereby trees may be felled, sectionalized and gathered into a package for transportation much more economically than has heretofore been possible when using conventional equipment and procedures.

Another object of the present invention is to provide a novel apparatus for felling trees which not only severs the trees rapidly and with a minimum of manual labor, but which also automatically controls the direction in which the trees will fall.

Still another object of the present invention is to provide a novel apparatus for felling trees in a manner which will eliminate much of the waste now obtained when trees are cut by means of conventional saws. More specifically, it is an object of the present invention to provide a novel apparatus for cutting trees substantially at the ground level so that more of the tree is harvested and so that little or no stump is left which will provide an obstacle for the tree harvesting machine.

Another object of the present invention is to provide a novel apparatus for cutting and sectionalizing trees in a manner which eliminates waste saw dust, which saw dust is formed in considerable quantities when present procedures are used and over a period of time will accumulate to provide a substantial loss of wood.

Another object of the present invention is to provide a novel method and apparatus for felling and sectionalizing trees and for treating ends of the log sections so as to reduce the possibility of entrance of decay, blue stain and other organisms into the log.

Another specific object of the present invention is to provide a novel method and apparatus for gathering sections of a tree into a bundle as they are severed from a felled tree and subsequently depositing the bundle on the ground in a position so that the log sections therein are in gravitational repose whereby relatively lightweight economical tieing material may be used to secure the bundle.

A further object of the present invention is to provide a novel method and apparatus for gathering sections of a tree into a bundle as they are severed from a felled tree and depositing the bundle on the ground in a position so that a crane sling may be easily passed therearound without being passed beneath the bundle.

Other objects and advantages of the present invention will become apparent from the following description and the accompanying drawings wherein:

Fig. 1 is a side elevational view of an apparatus embodying the principles of this invention;

Fig. 2 is a fragmentary sectional view illustrating the manner in which the apparatus of this invention is used to fell a tree;

Fig. 3 is a fragmentary sectional view showing how the apparatus may be used to sectionalize the tree;

Fig. 4 is a plan view of the novel apparatus of this invention;

Fig. 5 is a perspective view of a bundle of log sections processed by the novel apparatus and method of this invention;

Fig. 6 is an end elevational view with certain elements of the apparatus omitted in order to show the novel tree-severing mechanism more clearly;

Fig 7 is an end elevational view of the novel apparatus with certain elements omitted in order to show more clearly the mechanism for stacking the log sections;

Fig. 8 is a side elevational view of that portion of the apparatus shown in Fig. 7;

Fig. 9 is an enlarged fragmentary sectional view taken along line 9—9 in Fig. 8;

Fig. 10 is an enlarged fragmentary perspective view of the tree-severing mechanism;

Fig. 11 is a cross sectional view taken along line 11—11 in Fig. 6;

Fig. 12 is an elevational view showing the novel tree-severing head pivoted from the horizontal position shown in Fig. 10 to a vertical position;

Fig. 13 is an enlarged fragmentary sectional view taken along line 13—13 in Fig. 8;

Fig. 14 is a cross sectional view taken along line 14—14 in Fig. 13;

Fig. 15 is an enlarged cross sectional view taken along line 15—15 in Fig. 8;

Fig. 16 is a cross sectional view taken along line 16—16 in Fig. 15;

Fig. 17 is an end elevational view of a novel trailer or cart incorporated in the novel apparatus of this invention;

Fig. 18 is a plan view of the cart shown in Fig. 17;

Fig. 19 is a side elevational view of a slightly modified cart;

Fig. 20 is a plan view of the cart shown in Fig. 19;

Fig. 21 is a diagrammatic illustration of the hydraulic circuit used in the apparatus of this invention;

Fig. 22 is a side elevational view showing a modified cart structure having unloading mechanism therein;

Fig. 23 is an end elevational view of the cart structure shown in Fig. 22; and

Fig. 24 is a fragmentary sectional view showing a slightly modified cutter head structure.

Referring now more specifically to the drawings wherein like parts are designated by the same numerals throughout the various figures, an apparatus 30 incorporating the features of the present invention is shown in Figs. 1 and 4. This apparatus includes a tractor 32 of any known construction including a frame 34, wheels 36 and an engine 38, a mechanism 40 for severing trees, and a mechanism 42 for gathering log sections into a bundle and depositing the bundle on the ground in the manner described below.

The tree-severing mechanism 40 and elements thereof are shown in Figs. 1 through 4, 6 and 10 through 12. This portion of the apparatus includes a heavy generally C-shaped frame member 44 which is connected to the tractor frame by a large pivot 46. A cutting head 48 is mounted on the frame member 44 by means of linkage and actuating mechanisms 50 so that it may be positioned for cutting in a horizontal plane as shown in Figs. 1, 2 and 10 and also for cutting in a vertical plane as shown in Figs. 3, 4, 6, 11 and 12. In addition, the linkage mechanism is such that the cutter head may be raised as shown in broken lines in Fig. 6 when not in use and may be lowered for severing a tree substantially at ground level as shown in Fig. 2 or at any desired point above the ground.

In accordance with the present invention, the cutting head 48 includes a heavy claw member 52 having an opening or slot 54 in one side thereof which is adapted to receive the trunk of a tree. A shearing blade 56 is slidably mounted in the claw member and is adapted to be actuated by a piston operating within a double acting hydraulic cylinder 58 fixed to the claw member. Preferably, the blade member is connected to a piston rod 60 by means of a flexible or swivel connection 62 (Fig. 12) to prevent binding of either the blade or the piston rod as a result of the stresses applied to the cutting head during cutting of a tree. It should be noted that the shearing blade 56 has considerable thickness so that it provides a wedging action as well as a shearing action during cutting of a tree. Furthermore, it should be noted that the length of the shearing and wedging blade 56 in the direction of its movement is preferably at least as great as the width of the opening or slot in the claw member. With this structure, it has been found that the cutting and wedging blade 56 positively controls the direction in which a tree being severed will fall. More specifically, the cutting and wedging blade acts upon a tree being severed so that it will fall in the direction of movement of the blade and it has been found that this is true even though wind is blowing against the direction of movement of the blade and the tree is initially leaning a substantial amount oppositely from the direction of movement of the blade. Preferably the cutting head is provided with an anvil 63 provided with a notch 65 adapted to receive the cutting blade to insure complete severing of all of the fibres in the tree. In some instances, it has been found desirable to provide the cutting head with a fixed blade 64 disposed oppositely from the shearing blade (see Fig. 24), which blade 64 functions to dig into the tree and prevent relative sliding or twisting movement between the tree and the cutting head.

The linkage and actuating mechanism for the cutter head is formed so that the hydraulic cylinders therein may be of relatively short practical lengths while still providing the desired range of movement for the cutter head. More specifically, the linkage mechanism 50 includes a built-up link 66 (Fig. 10) which is pivoted to the frame member 44 by a shaft 68 and which has a pair of arms 70 fixed thereto and extending laterally and downwardly therefrom in the manner shown. A shaft 72 extends through the lower ends of these arms and pivotally supports opposite legs 74 of a built-up U-shaped linkage member. This linkage member has a transverse section 76 extending between the legs 74 and a built-up panel section 78 formed as a continuation of one of the leg portions 74 and extending laterally outwardly of the transverse section 76. As shown in the drawings, the panel section 78 preferably depends well below the pivot shaft 72 and the cutter head 48 is hinged as at 80 to the lower edge of the panel section.

In order to actuate the linkage mechanism 50, a double acting hydraulic cylinder 82 is pivotally connected as at 84 (Fig. 6) to the frame member 44 and a piston rod 86 extending from the cylinder is pivotally connected to the upper end of the link member 66 as at 88. A pair of links 90 each have one end pivotally connected as at 92 to the upper end of the link member 66 and opposite ends connected by a pin 94 to upper ends of a pair of links 96. The lower ends of the links 96 are pivotally connected to the transverse section 76 by means of a pin 98. A second double acting hydraulic cylinder 100 is disposed between the arms 70 and pivotally connected thereto by a shaft 102, and a piston rod 104 extending from the cylinder is pivotally connected to the links 90 by a pin 106. A third double acting hydraulic cylinder 108 has its end pivotally connected by a pin 110 to an upper marginal portion of the linkage member panel section 78, and a piston rod 112 (Figs. 10 and 11) extending from this cylinder is pivotally connected to lugs 114 on the cutter head by means of a pin 116. It should be noted that the lugs 114 are disposed closely adjacent to the hinge 80 so that the piston rod 112 need be actuated only a short distance in order to swing the cutter head through an arc of 90° or more around the axis of the hinge 80.

The operation of the linkage and actuating mechanism 50 is shown best in Figs. 6, 10 and 11. In Fig. 6 the cutter head 48 is shown by the broken lines in an inoperative position to which it may be raised while the apparatus is being driven from one tree to another or from one location to another. In order to raise the cutter head to the broken line position, the piston rods 86 and 104 are extended and the piston rod 112 is retracted. This causes the linkage member 66 to swing in a clockwise direction as viewed in Fig. 6 whereby the pivot shaft 72 is raised and at the same time, the linkage arms 74 are pivoted about the shaft 72 in a clockwise direction further to vertically lift the cutter head and also to swing the cutter head toward an upright position. The retraction of the piston rod 112 causes the cutter head to swing about the hinge 80 to a position substantially parallel with the panel section 78. In order to lower the cutter head to the full line position, it is merely necessary to retract the piston rods 86 and 104. It will be appreciated that the cutter head may be adjusted to a position flush with the ground or at any desired height above the ground by actuating the piston rod 86 to raise or lower the pivot shaft 72 and at the same time, the cutter head may be positioned at any desired angle to the ground by actuating the piston rod 104. Thus, it is seen that the cutter head may be adjusted to sever a tree substantially at ground level when the ground slopes either upwardly or downwardly from the tractor as well as when the ground is flat.

The mechanism 42 for gathering and packaging log sections is shown in Figs. 1, 4, 8, 9 and 13 through 20. This mechanism includes a novel trailer or cart 120 and lifting means 122 for picking up log sections and depositing them in the cart. The cart 120 includes a frame 124 mounted on an axle 126 of a pair of wheels 128. A tongue 130 is rigidly connected to the cart frame and extends forwardly thereof for connection with the frame member 44. The tongue 130 and frame member 44 are hinged together as at 132 for pivotal movement about a vertical axis. It should be noted that the vertical hinge 132, in combination with the horizontally disposed pivot 46 connecting the frame member 44 to the tractor, prevents vertical jack-knifing between the tractor and trailer while at the same time, the trailer or cart is free to turn relative to the tractor and to tilt relative to the tractor about the horizontal axis of the pivot 46 whenever such tilting is necessary for the cart to follow the contour of the ground. It has been found that this structure enables the apparatus to be maneuvered easily and this is especially important when operating the apparatus in a heavily wooded area.

The cart or trailer is provided with a generally V-shaped bottom structure 134 which is supported on the frame 124 so as to insure bunching of the log sections together when the sections are deposited in the cart in the manner to be described below. Pairs of corner posts 136 and 138 extend upwardly from opposite sides of the bottom structure 134 so that a considerable number of log sections may be stacked on the cart.

In accordance with a feature of the present invention, the cart is constructed so that it is capable of discharging a stack or bundle of log sections thereon onto the ground in a predetermined manner. Thus, the bottom structure 134 of the cart is pivotally mounted to opposite sides of the frame 124 by a pair of brackets 140, each of which is fixed to a shaft 142 (Fig. 9) pivotally mounted in a bearing member 144 welded or otherwise secured to the frame. In order to actuate the bottom structure to and from the solid line position and the broken line position shown in Fig. 8, a pair of levers 146 is provided, each of which has one end fixed to one of the pivot shafts 142, and a pair of hydraulic cylinders 148 is provided. Each of the cylinders 148 has one end thereof pivotally connected with the frame 124 and piston rods 150 extending from the opposite ends of the cylinders are pivotally connected to the free ends of the levers 146.

In order to retain a bundle of log sections together while the cart is tipped to its discharging position, means is provided on the cart for clamping the upper layer of logs in the bundle. In the embodiment illustrated in Figs. 17 and 18, this means includes pairs of arms 152—152 and 154—154. The arms 152 are fixed to a shaft 156 which extends between and is journaled in the upstanding posts 136, and the arms 154 are similarly fixed on a shaft 158 journaled in the upstanding posts 138. A pinion 160 is fixed on the shaft 156 and meshes with a rack 162 carried by a piston rod 164 which is actuated by a double-acting hydraulic cylinder 166 mounted on one of the posts 136. As will be understood, the arm 152 may be swung to and from the inoperative position shown in solid lines in Figs. 17 and 18 and the operative log-confining position shown in broken lines by actuating the piston rod 164. Similar means including a pinion 168, a rack 170 on a piston rod 172 and a hydraulic cylinder 174 is provided for actuating the arms 154.

In Figs. 19 and 20, there is shown a modified form of the means for retaining the logs during tipping of the cart. This means includes arms 176 and 178, respectively, pivotally connected to upstanding posts 136 and 138 by shafts 180 and 182. It should be noted that the arms 176 and 178 are disposed for pivotal movement in planes which are parallel with the longitudinal axis of the apparatus. A chain 184 is connected between the free ends of the arms 176 and 178 so that when the arms are swung to the broken line position shown in Figs. 19 and 20, the chain or other suitable flexible element overlies and confines the log sections. In order to actuate the arm 176, a pinion 186 is fixed on the shaft 180 and a rack 188 is carried by a piston rod 190 in meshing engagement with the pinion. The piston rod is actuated by a double-acting hydraulic cylinder 192 fixed on the post 136. Similar means including a pinion 194, a rack 196 and a double-acting hydraulic cylinder 198 is provided for actuating the arm 178.

The lifting mechanism 124 and elements thereof are shown best in Figs. 7, 8, and 13 through 16. This mechanism includes an upstanding pedestal 200 fixed on the frame of the cart and having a pivot shaft 202 extending through a bifurcated upper end portion thereof. A short lever 204 is pivotally mounted on the shaft 202 and a relatively long boom arm 206 (Fig. 7) is also mounted on the shaft. In order to swing the boom arm through an arc substantially greater than 180°, a first hydraulic cylinder 208 has an end thereof pivoted to the cart frame by a pin 210, and a piston rod extending from the opposite end of the cylinder is pivoted to the lever 204 by a pin 214. A second hydraulic cylinder 216 has one end thereof pivoted to the boom arm 206 by a pin 218, and a piston rod 220 extending from the opposite end of this cylinder is pivotally connected to the lever 204 by a pin 222. With this structure, it is seen that the hydraulic cylinder 216 and the piston rod 220 connect the boom arm and the lever 204 so that the boom arm will move with the lever. In addition, the boom arm will rotate relative to the lever when the piston rod 220 is actuated. Thus, with the piston rods 212 and 220 retracted the boom arm will be located in the position shown by the solid lines in Fig. 7. As the double-acting cylinder 216 is operated to extend the piston rod 220, the boom arm will be rotated relative to the lever 204 and raised to the intermediate position shown in broken lines in Fig. 7. After the piston rod 220 has been fully extended, the cylinder 208 is operated to extend the piston rod 212 and this causes the boom arm to continue to rotate toward the final broken line position shown in Fig. 7.

A log section gripping head 224 is mounted on the outer free end of the boom arm 206 in a manner so that it will automatically assume the proper position for picking up a log section and the proper position for discharging a log section into the cart. More specifically, a tubular sleeve 226 (Figs. 4, 15 and 16) is fixed on the outer end of the boom arm and extends parallel to the axis of rotation of the boom arm. The gripping head includes a shaft 228 which is journaled in the sleeve 226 so that as the boom arm is rotated, the gripping head, under the influence of gravity, is free to rotate relative to the boom arm so as to remain in the proper position. If desired, means may be provided for adjusting the gripping head in a direction parallel to the axis of rotation of the boom arm. As shown in Figs. 15 and 16, this means includes a double-acting hydraulic cylinder 230 disposed within the sleeve 226 and fixed to a plate 232 closing one end of the sleeve by a pivot pin 234. A piston rod 227 extending from the cylinder is connected to the shaft 228 by a pin 236, which shaft is tubular in shape so that it may telescope over the hydraulic cylinder when the piston rod is retracted. Since the piston rod may rotate relative to the hydraulic cylinder, this adjusting means does not prevent the shaft 228 from rotating relative to the sleeve 226.

The gripping head 224 includes a plurality of jaw members 240, 242 and 244 pivotally disposed on the shaft 228 and respectively carrying serrated or roughened log gripping pads 246, 248 and 250 at their lower ends. As shown best in Figs. 15 and 16, the jaw members 240 and 242 are connected together to operate in unison by a pin 252 extending through portions thereof which project above the shaft 228. Furthermore, the jaw members 240 and 242 are disposed in opposing relationship with respect to the jaw member 244 and downwardly extending portions 254 and 256 of the members 240 and 242 are flared in opposite directions to position the log gripping pads 246 and 248 substantial distances from opposite sides of the pad 250. With this arrangement the gripping head is adapted to grasp a log section with secure three-point engagement.

In order to close the jaw members to grasp a log section, a single acting hydraulic cylinder 258 is pivotally connected to an upper extension of the jaw member 244 by means of a pin 260. A piston rod 262 extending from the cylinder is pivotally connected to the pin 252. Thus, upon actuation of the cylinder to extend the rod 262, the jaw members will be closed to grip a log section. Tension springs 264 and 266 are connected between the pins 260 and 252 for automatically opening the jaw members when the hydraulic pressure in the cylinder 258 is released and for normally retaining the jaw members in an open condition.

A hydraulic control system for the apparatus is diagrammatically shown in Fig. 21, but it will be understood that various modifications may be made in the control system, if desired. The illustrated control system includes a reservoir 270 adapted to contain a supply of hydraulic fluid, a cooler 272 of known construction connected with the reservoir by a conduit 274, which cooler is provided to prevent undue overheating of the hydraulic fluid. A pump 276 has its inlet connected to the cooler by a conduit 278 and its outlet connected to a plurality of control valves through conduits 280, 282, 284, 286 and 288. In addition, the power line 280 is preferably connected with a relief valve 290 by a conduit 292 and the relief valve is, in turn, connected with the reservoir by a conduit 294. The pump is driven by the engine of the tractor and the relief valve serves to permit circulation of the fluid back to the reservoir when the fluid discharged by the pump is not being used to actuate the various hydraulic cylinders. Preferably the pump is of a variable displacement type so that the output thereof may be varied to the approximate amount needed to reduce heating of the fluid and the power used to drive the pump. Suitable electrical control device 275 is provided for varying the output of the pump, which device is in turn actuated by means, not shown, in response to the operation of the various hydraulic control valves described below. As shown best in Fig. 1, the reservoir, the cooler and the pump are mounted on the tractor frame at any convenient location such as the forward end thereof, and a suitable driving connection such as a shaft 296 is provided between the tractor engine and the pump.

The hydraulic power line 284 is connected with the inlet of a valve box 298 which contains a plurality of three-way valves 300, 302, 304 and 306. An outlet of the valve box is connected by conduits 308, 310 and 312 with the reservoir. The valve 300 has a pair of ports connected with opposite ends of the hydraulic cylinder 108 through conduits 314 and 316 and the valve 302 is similarly connected with opposite ends of the hydraulic cylinder 58 through conduits 318 and 320. The valve 304 is connected with opposite ends of the cylinder 82 by means of conduits 322 and 324, and the valve 306 is connected with opposite ends of the cylinder 100 through conduits 326 and 328. The valves may be of any suitable known construction and, therefore, need not be described in detail. However, their structure should be such that they have inlet ports connectable with the power line 284 and outlet ports connected with the conduits leading to their associated cylinders and selectively connectable with the inlet ports. Thus, when the valves are in one position, the inlet ports will be closed and their associated cylinders will be inoperative. When the valves are moved to another position, the inlet ports will be opened and fluid under pressure will be directed to one end of their associated cylinders and fluid forced from the opposite ends of their associated cylinders will be returned through the valve and the return line 308 to the reservoir. When the valves are moved to a third position the fluid under pressure will be directed to the opposite ends of their associated cylinders.

The hydraulic power line 286 is connected with an inlet of a valve box 330 which is similar to the valve box 298, described above. The valve box 330 has a return outlet connected with the return line 308 by a conduit 332 and a plurality of individual valves 334, 336, 338, 340 and 342. The valve 334 is a two-way valve connected with the single-acting cylinder 258 by a conduit 344, and the valve 336 is a three-way valve having ports connected with opposite ends of the cylinder 230 by means of conduits 346 and 348. The valves 338 and 340 are also three-way valves and are respectively connected with opposite ends of the cylinders 208 and 216 by means of conduits 350—352 and conduits 354—356. The three-way valve 342 is connected with one end of both of the cylinders 166 and 174 by a conduit 358 and branch conduits 360 and 362 and with the opposite ends of these cylinders by a conduit 364 and branch conduits 366 and 368 whereby these cylinders are actuated in unison. If desired, another control valve and additional conduits, not shown, could be provided so that the cylinders 166 and 174 could be operated independently of each other.

The hydraulic power line 288 is connected with an inlet port of a three-way valve 370, which valve is connected to control the operation of the cart-tilting cylinders 148 and is, therefore, preferably located at a position by itself so as to preclude accidental tilting of the cart. A return port of the valve 370 is connected by a conduit 372 to the hydraulic return line 310. Another port of the valve is connected by a conduit 374 and branch conduits 376 and 378 to one end of each of the cylinders 148 and still another port of the valve is connected by a conduit 380 and branch conduits 382 and 384 to opposite ends of these cylinders.

The method of harvesting and processing trees in accordance with the present invention and with the novel apparatus of this invention will now be described. To initiate the process the apparatus is first driven to a position adjacent a tree to be harvested with the cutter head in a raised inoperative position. Then the valves 304 and 306 are operated to actuate the hydraulic cylinders 82 and 100 and retract the piston rods 86 and 104 until the cutter head has been lowered to a position substantially at ground level. In addition, the valve 300 is operated to actuate the hydraulic cylinder 108 so as to extend the piston rod 112 until the cutter head assumes a horizontal or substantially horizontal position depending on the ground contour adjacent the tree. Then the tractor is driven forwardly until a tree 390 to be severed enters the notch or opening in the side of the cutter head, as shown in Fig. 2. With the tree confined by the cutter head, the valve 302 is operated to actuate the hydraulic cylinder 58 and extend the piston rod 60 so that the cutting and wedging blade 56 is advanced to shear the tree. When the blade 56 initially engages the tree, the anvil 63 or the fixed blade 64 is drawn tightly against the tree and serves to prevent the outer free end of the cutter head from sliding upwardly along the tree trunk. This, coupled with the fact that the inner end of the cutter head is rigidly supported, prevents the cutter head from tilting or twisting relative to the tree and insures smooth cutting of the tree in the desired manner.

As mentioned hereinabove, the broad solid blade 56 which tapers from a relatively thick body portion to a relatively narrow cutting edge not only serves to sever the tree trunk, but also serves to tilt the tree so that the tree falls in a controlled manner. It has been found that a tree severed with the apparatus of this invention will automatically fall substantially in the direction of movement of the cutting and wedging blade 56 regardless of the direction in which the wind may be blowing at the time or the direction in which the tree may be leaning. It has also been found that the shearing and wedging action of the blade 56 crushes the ends of the wood fibers in the tree trunk so that the fibers are sealed against the entry of decay, blue stain and other organisms which cause deterioration of the tree. Since the cutting or shearing blade 56 moves relatively slowly as compared to blades of power saws, it may be operated substantially at ground level without danger of injury thereto since any obstacle such as a rock contacted thereby will be merely pushed aside, while on the other hand, such a rock might break a conventional saw. In addition, the shearing or cutting blade 56 creates no sawdust and this in combination with the fact that the tree may be cut much closer to the ground enables harvesting of substantially more of a tree than can be harvested by utilizing conventional methods and apparatus.

After the tree 390 (Fig. 2) has been felled, its branches may be skinned therefrom by hand axes and saws and if desired, at least some of the larger branches may be sheared by manipulating the cutter head 48. With the branches skinned from the tree trunk, the apparatus is manipulated so that it is parallel with the trunk and the hydraulic cylinder 108 is actuated to position the cutter head substantially in a vertical plane as shown in Fig. 6. Then the cutter head is lowered over the tree trunk at any desired point and the blade is actuated so as to sever a section from the trunk. During this severing wood fibers are also crushed so as to be sealed against the entry of decay and other organisms. Either before or after the section 392 is severed the valves 338 and 340 are operated to actuate the cylinders 208 and 216 in a manner that will cause the piston rods 212 and 220 to be retracted in order to position the jaws of the gripping head 224 over the tree as shown in Fig. 7. In addition, the valve 334 is operated to actuate the hydraulic cylinder 258 and close the jaws against the tree or log section 392. If necessary, the valve 336 may have been previously operated to actuate the hydraulic cylinder 230 and axially adjust the gripping head with respect to the cutting head so that the gripping head is positioned substantially over the center of the log section.

After the log section 392 has been severed from the trunk and grasped by the gripping head 224, the valves 338 and 340 are operated to actuate the cylinders 208 and 216 and swing the boom arm 206 until the gripping head has reached any desired position over the bottom structure 134 of the cart. Then the valve 334 is operated to release the hydraulic pressure in the cylinder 258 and the springs 264 and 266 cause the jaws of the gripping head to open to permit the log section to drop to the bottom of the cart. Then the apparatus is driven forwardly along the fallen tree trunk and another section is severed from the trunk and deposited in the cart in the manner described above. This operation is repeated until the entire fallen tree trunk is sectionalized and all of the sections are deposited in the cart. It should be noted that the log section lifting mechanism is constructed and is arranged with respect to the cutter head in such a manner that the gripping head may be automatically moved by a single operator sitting on the tractor to the proper position for gripping the severed log section and then to the proper position for discharging the log into the cart with the longitudinal axis of the log disposed substantially parallel to the longitudinal axis of the cart. It should also be noted that in accordance with the present invention, the stack of logs in the cart is advanced with the cutting mechanism. This should be distinguished from the current practice wherein a fallen tree is sectionalized by operators using saws and the like whereupon each individual log section is carried to a remotely positioned stack, which practice requires considerably more time and labor than does the method of gathering the log sections disclosed herein.

After a sufficient number of log sections has been accumulated in the cart, the log sections are deposited on the ground in the form of a bundle 394 shown in Fig. 5. This is accomplished by operating the valves 370 to actuate the cylinders 148 and tilt the cart to the position shown in broken lines in Fig. 8 so that the log sections slide endwise onto the ground. However, before the cart is tilted the valve 342 is operated to actuate the hydraulic cylinders 166 and 174 in a manner to cause the arms 152 and 154 to swing to their log retaining positions shown in broken lines in Fig. 17. As the log sections are discharged from the cart, it will be appreciated that the stack is jarred so that the ends of substantially all of the sections engage and rest on the ground and since the logs are deposited in substantially upright positions, they are in a state of gravitational repose whereby they may be tied by a relatively light weight wire, metal strap or a rope 396 to provide a neat, compact and stable bundle. If desired, the flexible tieing member 396 may be laid across the bottom of the cart before the log sections are stacked in the cart whereby it is only necessary to bring and secure the ends of the tieing member together after the logs have been discharged onto the ground. Another advantage of the upright positioning of the log sections in the bundle 394 is that when it is desired to transport the bundle, a sling from the crane, not shown, may be easily slipped over the top of the bundle and tightened around the sides thereof.

At times it may be desirable to discharge a bundle of logs from the cart and directly onto a truck. In order to accomplish this a cart structure 400 of the type shown in Figs. 22 and 23 may be substituted for the cart structures described above. The basic structure of the cart 400 is similar to the carts described above and includes a pair of wheels 402 and 404 on an axle 406 and a bottom structure 408 pivotally supported on the axle by hinge means 410 and 412. Corner posts extend upwardly from the four corners of the cart of which posts only three are shown as indicated by the numerals 114, 416 and 418.

In order to lift a bundle 394 of logs from the cart and to deposit the logs on a truck 420 of known construction parked behind the cart as shown in Fig. 22, lifting and transferring means 422 is mounted on the cart. This means includes a generally U-shaped frame 424 having legs 426 and 428 respectively pivotally connected with the upper ends of the posts 416 and 418 by shafts 430 and 432. In order to swing the frame 424 from the inoperative position shown by solid lines in Figs. 22 and 23 to and from the various broken line positions shown in Fig. 22, a pinion 434 is fixed on the shaft 430 and is actuated by a rack 436 mounted on or integral with a piston rod 438. The piston rod in turn is actuated by a suitable hydraulic cylinder 440 which may be controlled by a valve, not shown, disposed adjacent the driver's seat on the tractor. In addition, a similar pinion 442 is fixed on the shaft 432 and is actuated by a rack 444 and a hydraulic cylinder 446. A lifting cable 448 having a hook or ring 450 fixed to one end thereof is threaded through a plurality of eye bolts 452, 454 and 456 on the frame structure 424 and between a pair of pulleys 458 and 460. One end of the cable is secured to an arm 462 of a lever member 464 which is pivotally mounted on a bracket 466 by a pin 468. The lever member or bell crank 464 is provided with another arm 470 which is pivotally connected by a pin 472 to the free end of a piston rod 474 which is actuated by an hydraulic cylinder 476 pivotally mounted to a bracket by a pin 478. The hydraulic cylinder 476 is a double acting cylinder and may be operated to extend and retract the piston rod and thereby pivot the bell crank between the solid and broken line positions shown in Fig. 22.

When the bundle of logs is to be loaded on the truck, one or more cable slings 480 and 482 are placed on the cart before the log sections are loaded onto the cart. Then after the desired number of log sections has been loaded onto the cart hooks 484 and 486 on the ends of the slings are connected with the ring 450 on the cable 448. Then the hydraulic cylinder 476 is actuated to pivot the bell crank or lever member 464 to the broken line position shown in Fig. 22 and thereby pull on the cable 448 so as to lift the bundle of logs above the cart. Then the cylinders 440 and 446 are actuated to swing the frame structure 424 and the bundle of logs to a position over the truck 420. It will be appreciated that the bed of the truck 420 may be relatively long as compared with the width of the bundle of logs so that a plurality of log bundles may be successively placed on the truck.

There are many occasions when it will be desired to utilize the cart structure 400 for depositing the bundle of logs on the ground in an upright position. In order to accomplish this the lifting mechanism 422 is pivoted to the inoperative position shown in solid lines and means is provided for overlying the logs and holding them in a bundle while the cart is tilted. In this embodiment this means includes the above mentioned bell crank or lever member 464 which is provided with another arm 488 and the above described double acting hydraulic cylinder 476. In addition, a chain 490 is provided which has one end attached to the bell crank arm 488 as at 492. When it is desired to tilt the cart and discharge the bundle of logs onto the ground the chain 490 is passed over the top of the bundle and the bell crank is initially positioned as shown in broken lines in Fig. 22. Then the free end of the chain is connected with lug means 494 at the side of the cart opposite the bell crank, and the cylinder 476 is actuated to pivot the bell crank to the solid line position and thereby draw the chain tightly against the top of the log bundle. After this has been accomplished the cart is tilted to deposit the bundle of logs onto the ground and the bundle is tied by any suitable lightweight flexible element.

While the preferred embodiments of the present invention have been shown and described herein, it is obvious that many structural details may be changed without departing from the spirit and scope of the appended claims.

The invention is claimed as follows:

1. An apparatus for processing trees comprising a self-contained mobile unit including mobile support means including a cart, power shear means mounted on said support means for severing a standing tree at one side of the unit, positively controlling the direction of fall of the severed tree and sealing ends of severed wood fibers in the tree, means on said support means for adjusting said shear means to sever sections from a fallen tree disposed at one side of said unit and substantially parallel to a longitudinal axis of said unit and seal ends of wood fibers of each of the tree sections as the unit and fallen tree are intermittently relatively moved to position the unit adjacent successive sections of the tree, means on said support means and movable to and from positions above the cart and extending laterally of said one side of the cart for successively picking up the tree sections substantially as they are severed from the tree and prior to successive relative movement of the unit and the fallen tree and for loading the sections on the cart in predeterminded arrangement with their longitudinal axes generally parallel, and means on said support means for unloading the tree sections from the cart and depositing the tree sections in a bundle on the ground with the tree sections standing on end.

2. An apparatus for processing trees comprising a tractor having a frame, a cart having a frame connected with the tractor frame so that the tractor and cart are movable as a unit, a power shear, means adjustably supporting said shear on one of said frames for positioning the shear laterally of said one frame to operate in a generally horizontal position and positions disposed at an angle to the horizontal for severing standing trees and sectionalizing fallen trees disposed at one side of said unit and substantially parallel to a longitudinal axis of the unit, said shear including a broad wedging blade for positively controlling the direction of fall of a standing tree and for sealing ends of severed wood fibers in the tree, and means mounted on one of said frames and having a gripping head movable in a predetermined plane disposed transversely of said unit for picking up tree sections disposed at said one side of the unit substantially as they are severed from a fallen tree and depositing said tree sections on the cart with their longitudinal axes substantially parallel.

3. An apparatus for processing trees comprising a tractor having a frame, a cart having a frame connected with the tractor frame so that the tractor and cart are movable as a unit, a power shear, means adjustably supporting said shear on one of said frames for positioning the shear laterally of one side of the unit to operate in a generally horizontal position and positions disposed at an angle to the horizontal and in a direction extending transversely of a longitudinal axis of the unit for severing standing trees and for sectionalizing fallen trees disposed at said one side of the unit, said shear including a broad uninterrupted wedging blade for positively controlling the direction of fall of a standing tree and for sealing ends of severed wood fibers in the tree, means mounted on one of said frames and having a gripping head movable in a predetermined plane disposed transversely of said unit for picking up tree sections disposed at said one side of the unit substantially as they are severed from a fallen tree and depositing said tree sections on the cart with their longitudinal axes substantially parallel, and means on one of said frames for tilting the cart to deposit tree sections thereon onto the ground in upright positions.

4. In a tree-proccessing apparatus including a mobile frame and means on said frame for severing standing trees and sectionalizing fallen trees, the combination comprising a cart adapted to be connected with said mobile frame means and to move therewith, and means connected with and movable with said cart for loading tree sections substantially as they are severed from a tree onto said cart, said loading means including a gripper head movable in a predetermined manner to and from positions above the cart and adjacent the ground at one side of a cart for gripping each tree section on the ground at said one side of the cart and disposed substantially parallel to the longitudinal axis of the cart in a predetermined manner and depositing the tree sections on the cart with their longitudinal axes generally parallel.

5. In a tree-processing apparatus including mobile frame means and means supported by said frame means for severing a standing tree and sectionalizing a fallen tree, the combination comprising a cart adapted to be connected with said frame means and to be moved therewith, and means connected with and movable with said cart for loading tree sections substantially as they are severed from the fallen tree onto said cart with their axes disposed substantially parallel to each other, said loading means including a pivotally mounted boom arm, actuating means for moving said boom arm in a predetermined plane to and from tree section pick-up and discharging positions, and a tree section gripping head offset from said plane longitudinally of said unit and connected with said boom arm for pivotal movement of the gripping head relative to the boom arm only about an axis substantially perpendicular to said plane to permit proper positioning of said gripping head for picking up and discharging tree sections while preventing said gripping head from turning so as to discharge a tree section with its axis disposed at a substantial angle from the axis of any other tree section on the cart.

6. An apparatus for harvesting trees comprising a self-contained mobile unit, power operated severing means mounted on said unit for severing a standing tree at one side of the unit, means on said support means for adjusting said severing means to sever sections from a fallen tree disposed at one side of said unit and substantially parallel to a longitudinal axis of said unit as the unit and fallen tree are intermittently relatively moved to position the unit adjacent successive sections of the tree, said unit including a portion for receiving and retaining a plurality of tree sections, and means on said unit and movable to and from positions above said receiving and retaining portion and extending laterally of said one side of the unit for successively picking up the tree sections substantially as they are severed from the fallen tree and prior to successive relative movement of the unit and the fallen tree and for loading the sections on said receiving and retaining portion in predetermined arrangement with their longitudinal axes generally parallel, and means on said unit for unloading the tree sections from said receiving and retaining portion and depositing the tree sections in a bundle on the ground with tree sections standing on end.

7. An apparatus for harvesting trees comprising a mobile unit, power operated severing means mounted on said unit for operation in a direction extending transversely of a longitudinal axis of said unit for severing standing trees and for severing successive sections from a fallen tree disposed generally parallel to said longitudinal axis of the unit as the fallen tree and the unit are intermittently relatively moved to position the unit adjacent successive sections of the fallen tree, said unit including a portion for receiving and retaining a plurality of tree sections, means mounted on said unit and movable transversely of said longitudinal axis for successively picking up tree sections substantially as they are severed from said fallen tree and depositing the tree sections on said portion with their longitudinal axes generally parallel, and means on said unit for unloading the tree sections from said portion and depositing the tree sections in a bundle on the ground with the tree sections standing on end.

8. A method of harvesting trees comprising successively severing sections from a felled tree, successively placing each section substantially as it is severed onto a stack with the axes of the sections in generally parallel relationship, relatively moving the stack and the felled tree after each section is severed so as to position the stack and each successive section of the tree in substantially adjacent relationship prior to and to facilitate each successive severing and stacking operation.

9. A method, as defined in claim 8, which includes the step of dumping a stack of sections on end onto the ground substantially in a state of gravitational repose.

10. A method of harvesting trees, as defined in claim 9, which includes the step of tying the dumped tree sections on end together with a flexible element.

11. A method of harvesting trees, as defined in claim 8, wherein said steps of severing said sections are accomplished by shearing, which method includes the step of substantially sealing ends of tree fibres being sheared during the shearing operation.

12. A method, as defined in claim 8, which includes the step of felling a standing tree at a predetermined location, said steps of successively severing and stacking sections from the felled tree being accomplished substantially at said predetermined location.

13. In a tree processing apparatus, mobile means including means for receiving a plurality of tree sections and retaining said sections in stacked relationship with their axes generally parallel to each other, power operated means on said mobile means for severing successive sections from a felled tree upon intermittent relative movement of said mobile means and the felled tree generally axially of the felled tree, and means mounted on said mobile means and including gripping means movable back and forth in a predetermined manner for positively transferring and orientating said successive sections of the felled tree with respect to and over said receiving and retaining means for causing the successive severed sections to be deposited on said receiving and retaining means with their axes in generally parallel relationship.

14. A tree harvesting apparatus, as defined in claim 13, which includes means for dumping the stack of tree sections on end from said receiving and retaining means and means for embracing and retaining the tree sections in stacked formation during a dumping operation.

15. A tree harvesting apparatus, as defined in claim 14, wherein said means for overlying and retaining the tree sections includes a flexible element having one end portion thereof connected with one side of said tree section receiving and retaining means and an intermediate portion passing over a stack of tree sections on said receiving and retaining means and continuing to a second end portion attached to an opposite side of said receiving and retaining means, and shiftable means connected with said second end of said flexible element at said opposite side for drawing the flexible element relatively tightly against the tree sections.

16. A tree harvesting apparatus, as defined in claim 13, wherein said severing means includes a shearing head, and means adjustably supporting said shearing head for vertical and pivotal movement for selectively positioning said shearing head for severing a standing tree and for severing sections from a fallen tree.

17. An apparatus for harvesting trees, as defined in claim 13, which includes additional means on said mobile means for simultaneously lifting a plurality of tree sections in a bundle from the receiving and retaining means and for transferring the bundle of tree sections to a discharge position laterally of the receiving and retaining means.

18. A unitary apparatus for felling, sectionalizing and bundling trees comprising a mobile unit, power operated severing means mounted on said unit for severing standing trees and including an element operable in a direction extending transversely of the longitudinal axis of said unit for severing successive sections from a felled tree disposed so that its longitudinal axis extends generally along the longitudinal axis of said unit when the felled tree and said unit are intermittently relatively moved for positioning said element for severing successive sections of the felled tree, said unit including a portion for receiving and retaining a plurality of severed tree sections, and means on said mobile unit and movable back and forth in a predetermined manner for successively positively transferring and orientating said successive tree sections of the felled tree over said receiving and retaining portion for causing depositing of successive severed tree sections in a predetermined manner on said receiving and retaining portion to provide a bundle of generally parallel tree sections on said portion, and means on said unit for discharging said bundle from said portion onto the ground in the bundle assembly position with the tree sections in the bundle standing on end.

19. An apparatus, as defined in claim 18, wherein said mobile unit includes means for propelling said unit and for providing power for actuating said severing means and said orientating means.

References Cited in the file of this patent

UNITED STATES PATENTS

| | | |
|---|---|---|
| 296,334 | Jones | Apr. 8, 1884 |
| 825,518 | Cox | July 10, 1906 |
| 1,592,656 | Corona | July 13, 1926 |
| 1,867,446 | Doubek | July 12, 1932 |
| 2,365,408 | Hillyer | Dec. 19, 1944 |
| 2,385,419 | Matulich | Sept. 25, 1945 |

(Other references on following page)

UNITED STATES PATENTS

| | | |
|---|---|---|
| 2,433,598 | Chadwick | Dec. 30, 1947 |
| 2,529,934 | Gracey et al. | Nov. 14, 1950 |
| 2,542,952 | White | Feb. 20, 1951 |
| 2,543,109 | Holowka | Feb. 27, 1951 |
| 2,550,185 | Busch | Apr. 24, 1951 |
| 2,603,365 | Moores | July 15, 1952 |
| 2,612,194 | Ingraham et al. | Sept. 30, 1952 |
| 2,635,659 | Gerdine | Apr. 21, 1953 |
| 2,643,012 | Wahl | June 23, 1953 |
| 2,697,459 | McFaull | Dec. 21, 1954 |
| 2,707,008 | Bannister | Apr. 26, 1955 |
| 2,751,943 | Ford | June 26, 1956 |

FOREIGN PATENTS

| | | |
|---|---|---|
| 1,068 | Great Britain | of 1864 |
| 28,860 | Netherlands | Jan. 16, 1933 |
| 122,748 | Australia | Nov. 7, 1946 |
| 139,716 | Australia | Dec. 15, 1950 |
| 356,164 | France | Sept. 23, 1905 |